United States Patent
Hadad

(10) Patent No.: US 8,408,851 B2
(45) Date of Patent: Apr. 2, 2013

(54) KEY DUPLICATION METHOD AND MACHINE

(75) Inventor: Yvan Hadad, Netanya (IL)

(73) Assignee: Mul-T-Lock Technologies Ltd., Yavne (IL)

( * ) Notice: Subject to any disclaimer, the term of this patent is extended or adjusted under 35 U.S.C. 154(b) by 1266 days.

(21) Appl. No.: 12/279,363

(22) PCT Filed: Feb. 7, 2007

(86) PCT No.: PCT/IL2007/000171
§ 371 (c)(1), (2), (4) Date: Aug. 14, 2008

(87) PCT Pub. No.: WO2007/093982
PCT Pub. Date: Aug. 23, 2007

(65) Prior Publication Data
US 2009/0074528 A1    Mar. 19, 2009

(30) Foreign Application Priority Data
Feb. 19, 2006   (IL) .......................................... 173803

(51) Int. Cl.
*B23C 3/35*     (2006.01)
(52) U.S. Cl. ........................................................ 409/82
(58) Field of Classification Search .................... 409/81, 409/82, 83; *B23C 3/35*
See application file for complete search history.

(56) References Cited

U.S. PATENT DOCUMENTS

| | | | |
|---|---|---|---|
| 5,676,504 A * | 10/1997 | Mueller et al. | 409/83 |
| 5,711,643 A * | 1/1998 | Parr et al. | 409/83 |
| 6,602,030 B1 * | 8/2003 | Markbreit | 409/81 |
| 6,687,565 B2 * | 2/2004 | Wetterlin et al. | 700/161 |
| 7,070,369 B2 * | 7/2006 | Jalove et al. | 409/84 |
| 7,077,607 B2 * | 7/2006 | Foscan | 409/84 |

FOREIGN PATENT DOCUMENTS

| | | |
|---|---|---|
| DE | 10031713 | 1/2002 |
| DE | 10031713 A1 * | 1/2002 |
| EP | 0779120 | 6/1997 |
| EP | 1270851 | 1/2003 |

(Continued)

OTHER PUBLICATIONS

EPO Machine Translation—Bosch, Karl-Heinz (2002). DE 10031713 A1.*

*Primary Examiner* — Daniel Howell
*Assistant Examiner* — Michael Vitale
(74) *Attorney, Agent, or Firm* — Dekel Patent Ltd.; David Klein

(57) ABSTRACT

A method for duplicating a key including receiving a key identification code indicative of key cuts in an original key, and duplicating the original key by forming key cuts in a duplicate key in response to the key identification code, wherein authorization to form the key cuts is restricted by means of a verification code that must be passed before forming the key cuts is permissible. The authorization to form the key cuts may be restricted in various ways, such as to a group of users, a geographic location of a user, or a group of key blanks. The authorization to form the key cuts may be restricted as a function of a physical characteristic of the original key. As another alternative, authorization to form the key cuts may be restricted as a function of whether the original key is a master key or a slave key.

5 Claims, 3 Drawing Sheets

FOREIGN PATENT DOCUMENTS

| | | |
|---|---|---|
| EP | 1339024 | 8/2003 |
| GB | 2340644 | 2/2000 |
| JP | 2002147075 | 5/2002 |
| WO | 99/06179 | 2/1999 |
| WO | 2005/080717 | 9/2005 |
| WO | 2006/032354 | 3/2006 |
| WO | 2006/102109 | 9/2006 |

* cited by examiner

KEY DUPLICATION METHOD AND MACHINE

FIELD OF THE INVENTION

The present invention relates generally to key duplicating machines, and particularly to a key duplicating machine with the capability of restricting duplication of an original key.

BACKGROUND OF THE INVENTION

When making a duplicate key, it is generally necessary to have the original key present at the time of duplication. The original key is generally held in a key duplicating machine that copies the key cuts from the original key to a copy of the key.

Key duplicating machines are known that do not require the original key to be present during the copying process. For example, U.S. Pat. No. 6,687,565 to Wetterlin et al. describes a key identification code and manufacturing method. After making measurements of a key, the measurements are converted into a compact format which can be read back at a later date or at a different location by apparatus capable of accurately reproducing the original key. The data may be stored on, for example, a sticker, paper strip, or magnetic swipe card. When the duplicate key is required, the data are read from the storage medium and transmitted to a suitable key duplication device to produce a reproduction key.

SUMMARY OF THE INVENTION

The present invention seeks to provide a key duplicating machine with the capability of restricting duplication of an original key, as is described more in detail hereinbelow. The machine may have a multiplicity of interfaces for inputting key duplication data.

There is thus provided in accordance with an embodiment of the present invention a method for duplicating a key including receiving a key identification code indicative of key cuts in an original key, and duplicating the original key by forming key cuts in a duplicate key in response to the key identification code, wherein authorization to form the key cuts is restricted by means of a verification code that must be passed before forming the key cuts is permissible. The authorization to form the key cuts may be restricted in various ways, such as to a group of users, a geographic location of a user, or a group of key blanks. The authorization to form the key cuts may be restricted as a function of a physical characteristic of the original key. As another alternative, authorization to form the key cuts may be restricted as a function of whether the original key is a master key or a slave key.

In another embodiment of the invention, the method may further include storing in memory how many times the original key was duplicated. Authorization to form the key cuts may include retrieving from memory how many times the original key was duplicated and restricting duplication of the original key as a function of how many times the original key was duplicated.

There is also provided in accordance with an embodiment of the present invention a machine for duplicating a key including an interface for inputting a key identification code indicative of key cuts in an original key, a processor in communication with the interface for receiving and processing the key identification code, and key-cut forming apparatus for forming key cuts in a duplicate key in response to the key identification code, wherein the processor is adapted to restrict authorization to form the key cuts by means of a verification code that must be passed before forming the key cuts is permissible.

A user-portable device may be provided that has the key identification code stored therein, wherein the interface is capable of transmitting the key identification code from the user-portable device to the processor. The interface may include a keyboard for inputting the key identification code.

DETAILED DESCRIPTION OF EMBODIMENTS

Figure 1A:
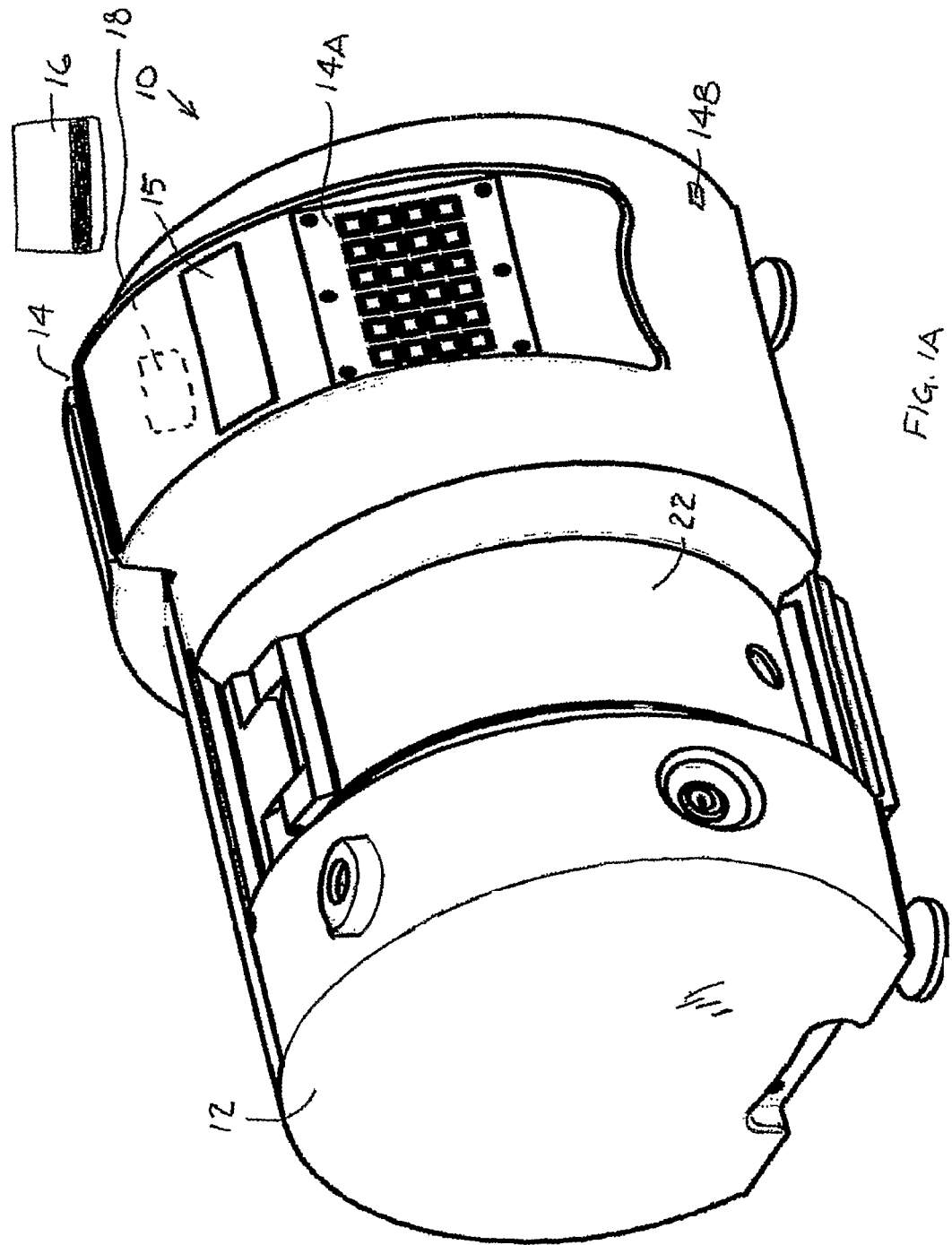
FIGS. 1A and 1B are simplified pictorial illustrations of a key duplicating machine, constructed and operative in accordance with an embodiment of the invention, with a cover respectively covering and exposing key-cut forming apparatus in the machine.
Figure 1B:
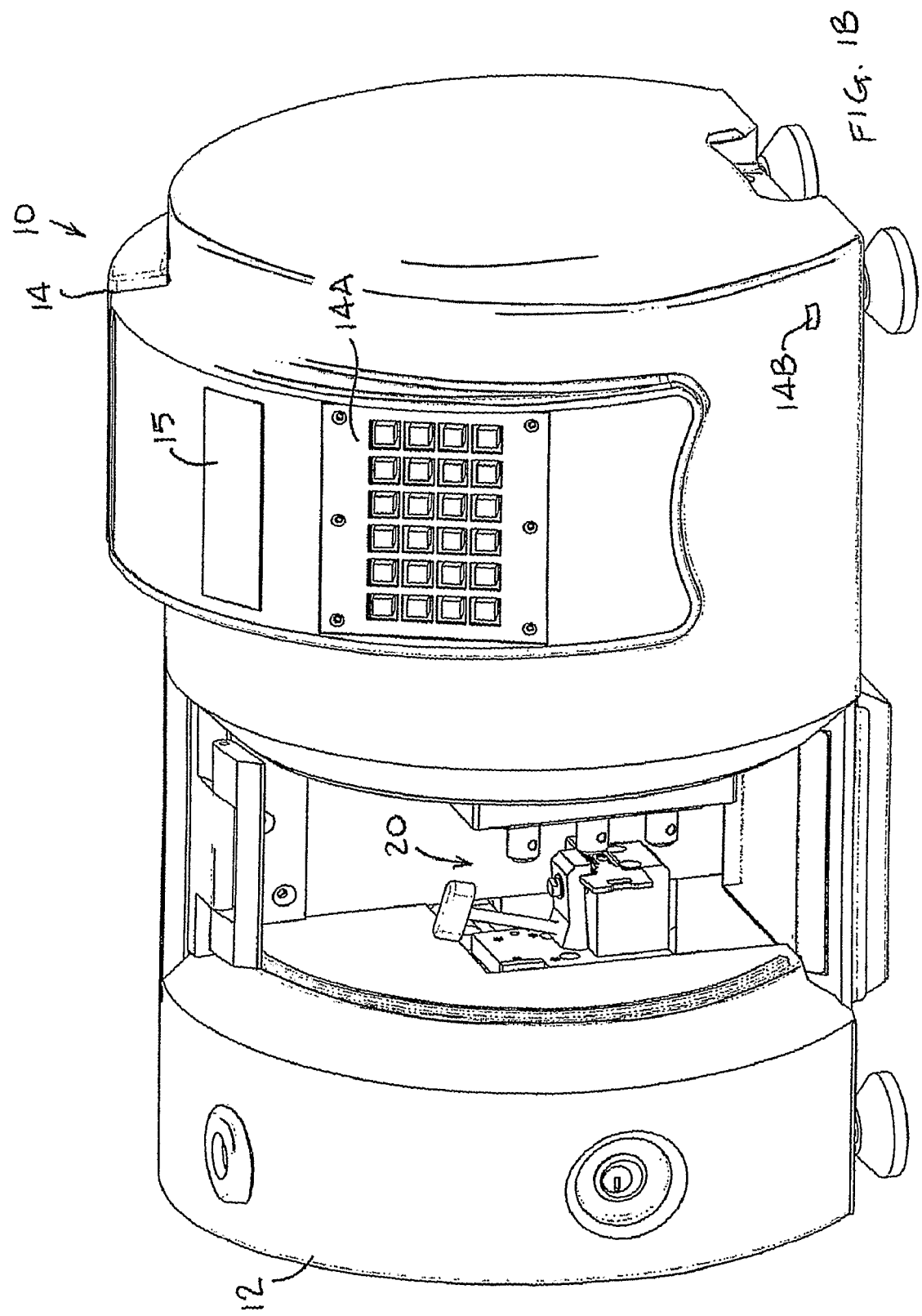

Reference is now made to FIGS. 1A and 1B, which illustrate a key duplicating machine 10, constructed and operative in accordance with an embodiment of the invention.

Key duplicating machine 10 may include a housing 12 with an interface 14 for inputting a key identification code indicative of key cuts in an original key. The key identification code may be stored in a user-portable device 16 (FIG. 1A), such as but not limited to, a magnetic swipe card, smart card or card with a bar code. Depending on the type of user-portable device 16, interface 14 may accordingly include, without limitation, a magnetic reader, smart card reader, bar code reader, etc.

The key identification code may be recorded on the user-portable device 16 by the key/lock manufacturer, and may include information about the depth of the key cuts that define the key combination (such as to lift pins to a shear line in cylinder lock), as well as other information regarding a physical characteristic of the key, such as but not limited to, the configuration of the keyway profile.

Key duplicating machine 10 may further include another interface 14A, such as a keyboard, that permits entering a key identification code of a key for which no user-portable device 16 has been manufactured. Thus, key duplicating machine 10 may have a multiplicity of interfaces for inputting key duplication data to cover any kind of key and is backward compatible with older keys. A display 15 may be provided for displaying the input code.

Key duplicating machine 10 may further include other interfaces 14B, such as a USB port or a LAN or high speed Internet connection, etc. Such interfaces may be used to download or upload the key identification code from/to another computer, remote server, Internet site, etc.

Key duplicating machine 10 may include a processor 18 (e.g., a microprocessor chip) in communication with interface 14 for receiving and processing the key identification code. Key duplicating machine 10 may further include key-cut forming apparatus 20 for forming key cuts in a duplicate key in response to the key identification code. A cover 22 may be used to cover access to key-cut forming apparatus 20. The key-cut forming apparatus 20 may be any suitable apparatus for machining or otherwise forming key cuts (e.g., singular, telescoping, etc.) and is well known to persons skilled in the art and does not require further description for them. An example of such apparatus is found in U.S. Pat. No. 6,602,030, assigned to Mul-T-Lock Technologies Ltd., which describes key-cut forming apparatus including two rotatable machining heads powered by a motor for forming key cuts on a key blank. A key blank clamping assembly securely and removably mounts a key blank during engagement thereof with the machining heads. A key blank translation assembly selectively positions the key blank clamping assembly such that a key blank mounted thereon is brought into desired engagement with the machining heads. The invention is not limited to this type of key-cut forming apparatus and the invention may be carried out with other kinds of key-cut forming apparatus, such as that described in U.S. Pat. No. 6,687,565 mentioned above.

As another option, the key-cut forming apparatus 20 may include machining heads capable of not only forming key cuts but also of identification marks on the key (e.g., letters, numerals or other characters).

It is further noted that processor 18 may be remote from key duplicating machine 10. For example, the processing may be done by some server connected to machine 10, such as by Internet connection.

In accordance with an embodiment of the invention, the processor 18 is adapted to restrict authorization to form the key cuts by means of a verification code that must be passed before forming the key cuts is permissible. For example, processor 18 may be pre-programmed with the verification code by the manufacturer (and the end user may be given permission and authorization to modify the verification code). As another example, the verification code may be included in the key identification code.

Figure 2:
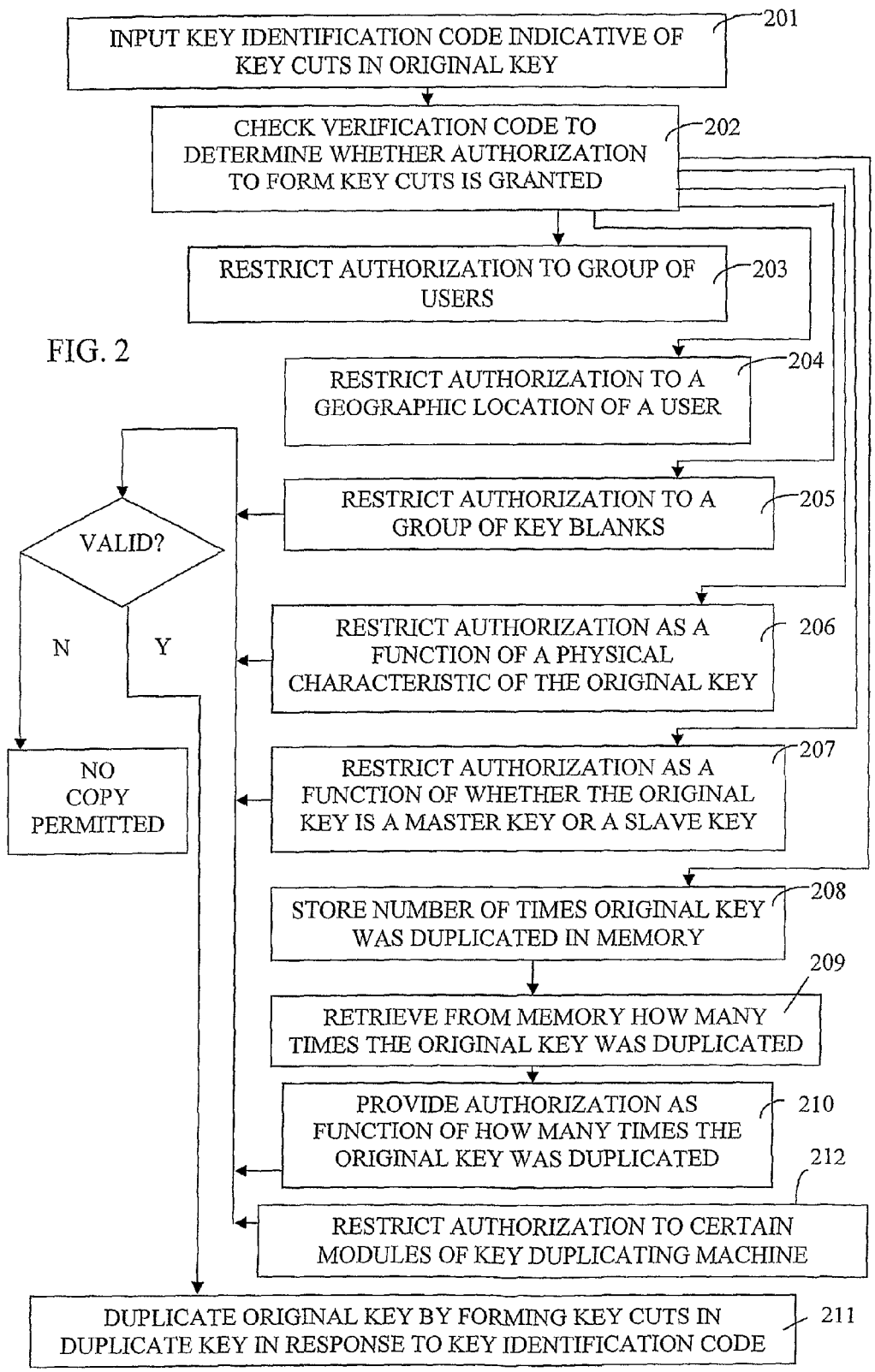
FIG. 2 is a simplified flow chart of a method for duplicating a key, in accordance with an embodiment of the invention.

Reference is now made to FIG. 2, which is a simplified flow chart of a method for duplicating a key, in accordance with an embodiment of the invention.

A key identification code indicative of key cuts in an original key is received (input) in step 201 (such as by swiping a magnetic swipe card in interface 14 or by inputting the code in the keyboard or by any other suitable way of inputting data, as described above). The processor 18 may check the verification code to determine whether authorization to form the key cuts is granted (202).

In accordance with an embodiment of the invention, authorization to form the key cuts may be restricted to a group of users (203). For example, authorization may be restricted to a group of employees at a place of work, a group of teachers at a school, law enforcement agents, etc.

In accordance with another embodiment of the invention, authorization to form the key cuts may be restricted to a geographic location of a user (204). For example, a manufacturer may wish to restrict sales or use of certain models of locks/keys to a marketing region (e.g., western Canada, Southeast Asia, etc.) and may use the verification code to restrict duplication of keys to these areas only.

In accordance with another embodiment of the invention, authorization to form the key cuts may be restricted to a group of key blanks (205), e.g., only Chevrolet model key blanks. In accordance with yet another embodiment of the invention, authorization to form the key cuts may be restricted as a function of a physical characteristic of the original key (206). For example, a manufacturer may wish to restrict duplication to a certain range of key profiles.

In another example, authorization to form the key cuts may be restricted as a function of whether the original key is a master key or a slave key (207).

In accordance with another embodiment of the invention, the number of times the original key was duplicated may be stored in memory (208). The processor 18 may retrieve from memory how many times the original key was duplicated (209), and then provide authorization to duplicate the key as a function of how many times the original key was duplicated (210). This feature may be used to limit the number of permissible copies of the original key, for example.

Once authorization has been provided, the original key may be duplicated by forming key cuts in a duplicate key in response to the key identification code (211).

In accordance with another embodiment of the invention, key duplicating machine 10 may comprise different key forming modules (e.g., key-cutting apparatus for cutting different kinds of key cuts, such as telescopic key cuts and non-telescopic key cuts, or apparatus for cutting keyways and key profiles) and authorization to operate key duplicating machine 10 may be restricted to only certain modules (a subset of the key forming modules) (212). In this manner, the manufacturer of key duplicating machine 10 can control which locksmiths or other users are authorized to perform certain key-cutting operations, and can charge money for enabling the use of additional modules or upgrading to other modules.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

What is claimed is:

1. A machine for duplicating a key comprising:
an interface for inputting a key identification code indicative of key cuts in an original key;
a processor in communication with said interface for receiving and processing said key identification code; and
key-cut forming apparatus for forming key cuts in a duplicate key in response to said key identification code, wherein said processor is adapted to restrict authorization to form the key cuts by means of a verification code that must be passed before forming the key cuts is permissible, wherein said key duplicating machine comprises different key forming modules and authorization to operate the key duplicating machine is restrictable to a subset of the key forming modules.

2. The machine according to claim 1, further comprising a user-portable device that has the key identification code stored therein, said interface capable of transmitting the key identification code from said user-portable device to said processor.

3. The machine according to claim 1, wherein said interface comprises a keyboard for inputting the key identification code.

4. The machine according to claim 2, further comprising a keyboard for inputting another key identification code.

5. The machine according to claim 1, wherein said key-cut forming apparatus is capable of forming key cuts and also identification marks on a key.

* * * * *